United States Patent [19]

Koga et al.

[11] 4,184,463
[45] Jan. 22, 1980

[54] INTERNAL-COMBUSTION ENGINE

[75] Inventors: Noritaka Koga, Sakado; Nobuo Yoshino, Tokyo; Touichi Yoshida, Kamifukuoka; Motofumi Takasugi, Tsurugashima, all of Japan

[73] Assignee: Honda Giken Kogyo Kabushiki Kaisha, Tokyo, Japan

[21] Appl. No.: 881,018

[22] Filed: Feb. 24, 1978

[30] Foreign Application Priority Data

Feb. 28, 1977 [JP] Japan .................. 52-21113

[51] Int. Cl.$^2$ .......................... F02F 3/00; F02B 31/00
[52] U.S. Cl. .................. 123/75 R; 123/1 R;
123/193 CP; 123/193 P; 92/126
[58] Field of Search ............... 123/75 R, 1 R, 59 NB,
123/84, 197 A, 193 R, 193 CP, 193 P, 195 AC,
191 L; 92/126, 127, 162 R

[56] References Cited

U.S. PATENT DOCUMENTS

| 1,138,892 | 5/1915 | Roberts | 92/126 |
| 2,160,755 | 5/1939 | Sandblom | 123/191 L |
| 2,235,475 | 3/1941 | Bruegger | 92/126 |

OTHER PUBLICATIONS

P. M. Heldt, Effects of Piston Pin Offset, (Automotive Industries, vol. 108 #5), Mar. 1, 1953, pp. 28-31, 73.

Primary Examiner—Charles J. Myhre
Assistant Examiner—M. Moy
Attorney, Agent, or Firm—Haseltine, Lake & Waters

[57] ABSTRACT

In an engine of the type having opposite side wall portions more or less differing from each other in rigidity, as in a so-called side valve engine, the axis of the piston unit is set at such an angle of inclination relative to the axis of the associated cylinder bore that the two axes substantially coincide with each other in the power or explosion stroke of the engine cycle when the cylinder block is tilted, under the tensile load acting on the engine structure, on account of the differential rigidity of the opposite side walls thereof. With this axis arrangement, an uneven wear of the mating bearing surfaces of the piston and cylinder and of the crankpin and bore in the large end of the associated connected rod is effectively prevented.

4 Claims, 7 Drawing Figures

INTERNAL-COMBUSTION ENGINE

BACKGROUND OF THE INVENTION

This invention relates generally to internal-combustion engines of the type including a cylinder block having at least one cylinder bore formed therein, a piston slidably fitted in the cylinder bore in the cylinder block to define a combustion chamber therein, a crankshaft connected with the piston, and a crankcase rotatably supporting said crankshaft, and more particularly to those types of engine in which the opposite side walls of the crankcase, which support the crankshaft at respective ends thereof, are more or less different from each other in rigidity.

One previously known form of internal-combustion engine built with such differential rigidity is a so-called "side valve" engine such as illustrated in FIGS. 1 and 1B of the accompanying drawings. As shown, the engine includes a crankcase 2 having a right-hand side shaft-bearing wall 2a formed integral with the cylinder block 3 of the engine to support the engine crankshaft 1 at its right-hand end. Also, the crankcase 2 has a left-hand side shaft-bearing wall 2b formed to support the crankshaft 1 at its left-hand end and removable from the engine block. Slidably fitted in the cylinder bore 6 formed in the cylinder block 3 is a piston 5, which defines a combustion chamber 9 in the cylinder block. Intake and exhaust valves 12 and 13 are provided on a side wall of the cylinder block 3 in association, respectively, with the intake and exhaust ports 10 and 11, which open into the combustion chamber 9. A timing gear 4 is arranged on the crankshaft 1 at a location adjacent to the exhaust valve 13 to operate the intake and exhaust valves 12 and 13 in phase with rotation of the crankshaft 1. In order to accommodate the timing gear 4, the left-hand side shaft-bearing wall 2b of crankcase 2 is formed so as to overhang largely beyond the cylinder block 3, as shown in FIG. 1. In general, with such structure, the left-hand side wall 2b of the crankcase exhibits a rigidity less than that of the right-hand side wall 2a thereof.

Investigation made by the inventors has shown that, in such structure of internal-combustion engine, the differential rigidity of the opposite shaft-bearing walls 2a and 2b is an important factor in causing uneven frictional wear of the component surfaces including the outer peripheral surface of piston 5 and the wall surface of the shaft-bearing bore 8a, formed in the connecting rod 8 at its large end.

Specifically, in the explosion or power stroke of the engine cycle, the explosion in the combustion chamber 9 acts as a tensile load on the engine structure between the crankshaft 1 and the cylinder block 7 and the tensile force, the largest occurrable in engine operation, causes more or less elongation in different sections of the crankcase 2 and cylinder block 3. Such elongation is particularly substantial on the left-hand side of the engine structure as the left-hand side shaft-bearing wall 2b of the crankcase 2 is less rigid than a right-hand side shaft-bearing wall 2a thereof, as described above. As the consequence, the cylinder block 3 is tilted or inclined to the right by an angle $\alpha$, as shown in FIG. 1A, exerting a turning moment on the piston 5 in the clockwise direction, and thus the connecting rod 8 is forced to tilt to the right. In this manner, the mating sliding surfaces such as of the piston 5 and cylinder bore 6 and of the crankpin 1a and associated bore 8a in the large end of connecting rod 8 are brought out of parallelism to make localized bearing contact with each other and the explosion load is concentrated at the location of contact, causing uneven wear of the associated parts.

SUMMARY OF THE INVENTION

In view of the above, the present invention has for its object the provision of an internal-combustion engine of the type concerned which is designed to prevent any such uneven wear of engine parts.

According to the present invention, there is provided an internal-combustion engine which is characterized by the fact that the axis of the piston is normally inclined at a definite angle with respect to the axis of the associated cylinder bore in that direction in which the cylinder block is forced to incline under the tensile load occurring with explosion in the associated combustion chamber.

The above and other objects, features and advantages of the present invention will become apparent from the following description when taken in conjunction with the accompanying drawings, which illustrate a few preferred embodiments of the invention.

DESCRIPTION OF THE PREFERRED EMBODIMENTS

Figure 1:
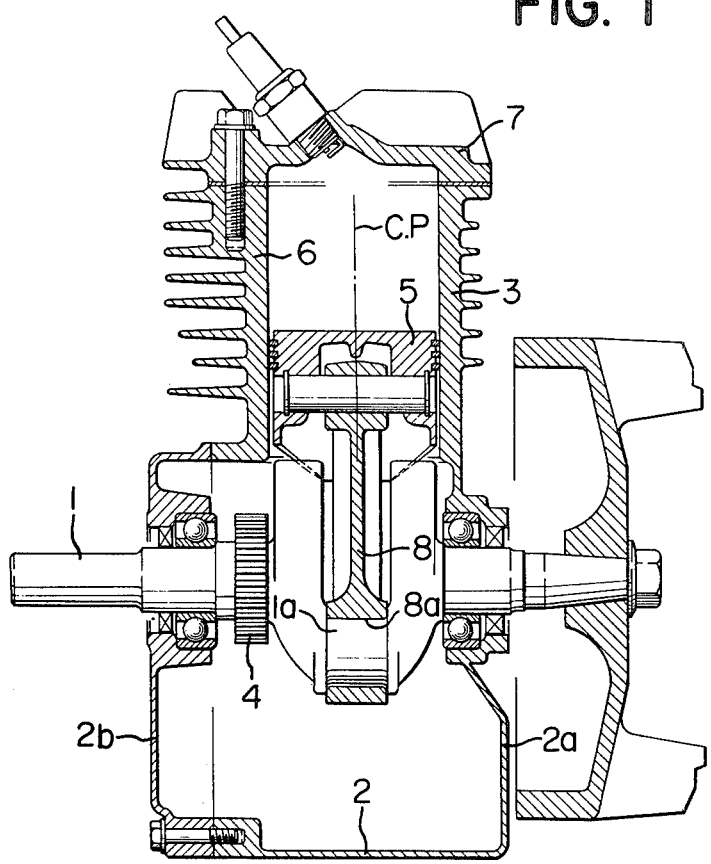
FIG. 1 is a longitudinal cross-sectional side elevation of a conventional form of side valve type internal-combustion engine.
Figure 1A:
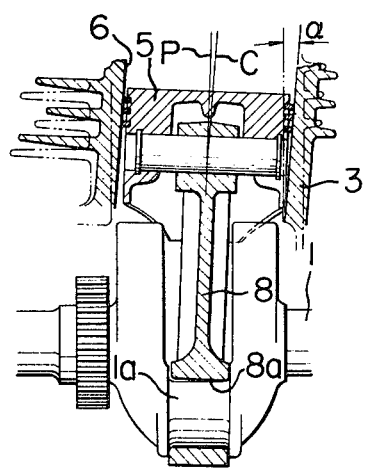
FIG. 1A is a fragmentary cross-sectional side elevational view thereof, showing the state assumed in the explosion stroke of the engine cycle.
Figure 1B:
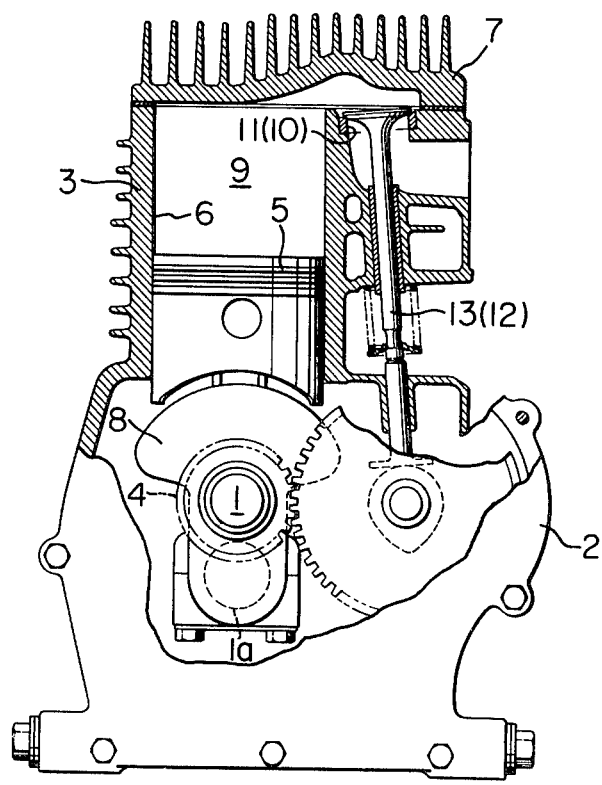
FIG. 1B is a front elevational view, partly cutaway, of the engine shown in FIG. 1.
Figure 2:
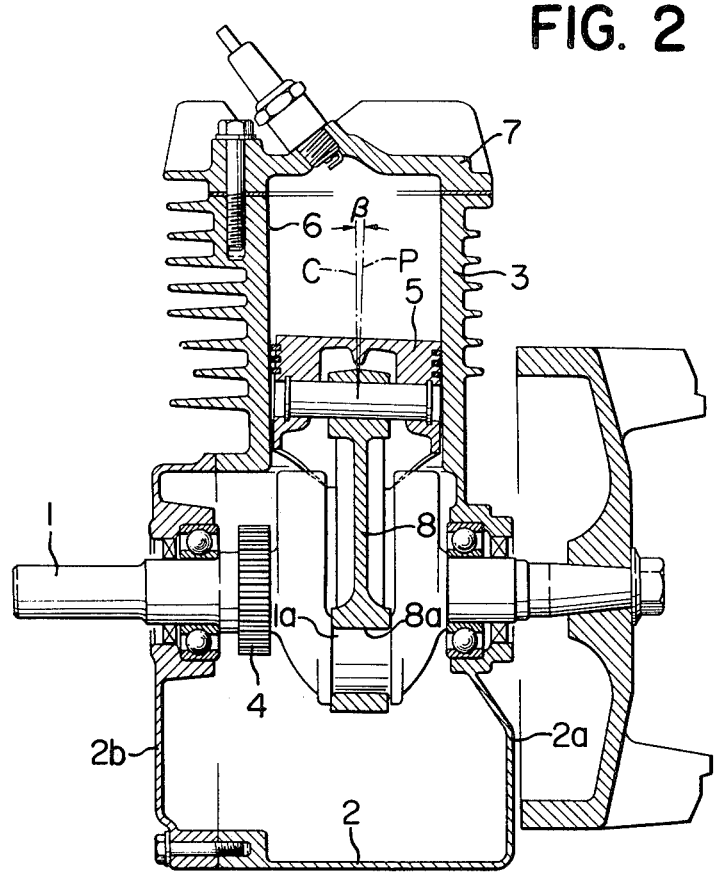
FIG. 2 is a view similar to FIG. 1, showing a preferred embodiment of the present invention.
Figure 2A:
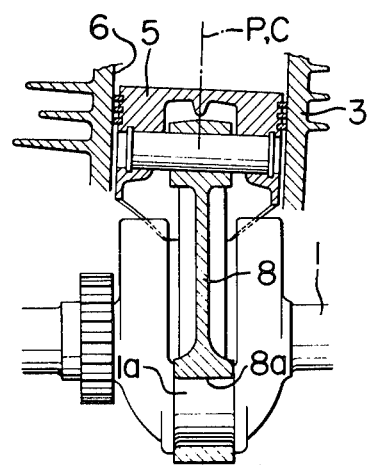
FIG. 2A is a view similar to FIG. 1A, showing the state of the engine of FIG. 2 in the explosion stroke.

Reference will first be had to FIG. 2, which illustrates an internal-combustion engine embodying the present invention. In this figure, reference character C indicates the axis of a cylinder bore 6 which extends conventionally at right angles to the axis of the crankshaft 1 of the engine and the axis P of the piston 5 is inclined at a definite angle $\beta$ relative to the bore axis C in a direction toward the right-hand side shaft-bearing wall 2a of crankcase 2, which is more rigid than the opposite side wall 2b thereof. Otherwise, the structure of the engine is similar to that of the engine shown in FIGS. 1 and 1B. In FIG. 2, the same reference characters have been used as in FIG. 1 for similar parts which have the same functions.

Figure 3:
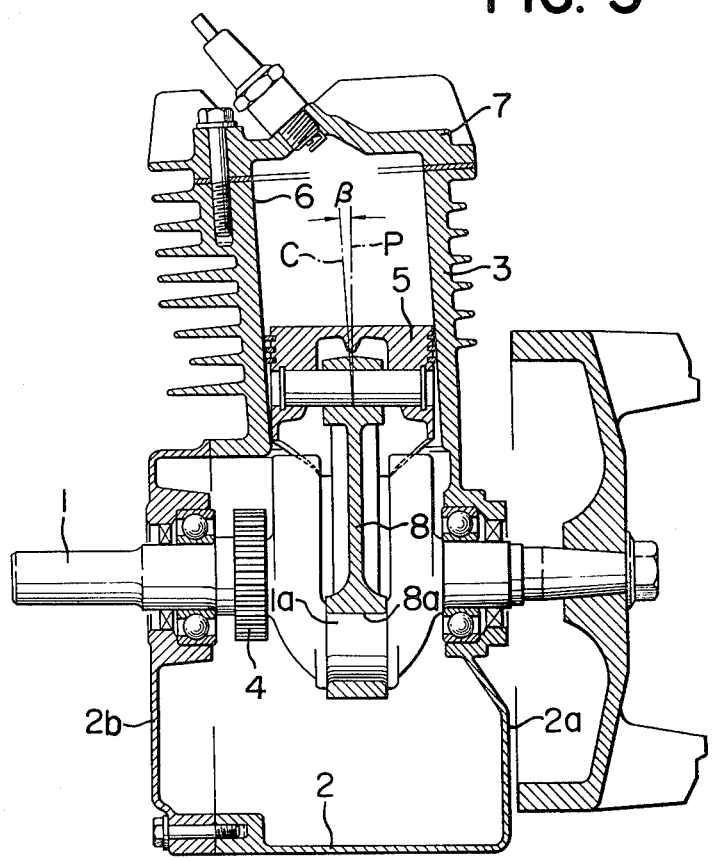
FIG. 3 is a view similar to FIGS. 1 and 2, showing another preferred embodiment of the present invention.
Figure 3A:
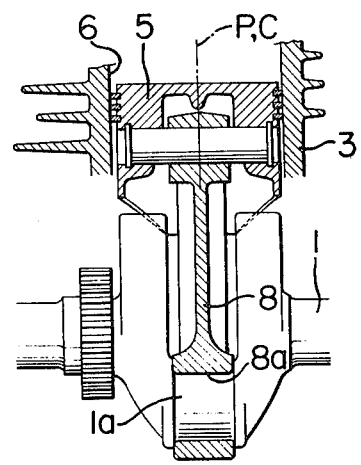
FIG. 3A is a view similar to FIGS. 1A and 2A, showing the state of the engine of FIG. 3 in the explosion stroke.

Another preferred embodiment of the present invention is illustrated in FIG. 3 and in which the axis P of piston 5 extends conventionally at right angles to the axis of crankshaft 1 while the axis C of cylinder bore 6 is inclined at a definite angle $\beta$ relative to the piston axis P in a direction toward the less rigid side wall 2b of crankcase 2. Otherwise, the engine structure is similar to that shown in FIG. 1 and again, in FIG. 3, the same references have been used as in FIG. 1 for similar parts which have the same functions.

In both of the above-described embodiments, it is to be understood that the relative angle of inclination $\beta$ between the axis P of piston 5 and the axis C of cylinder bore 6 is selected so as to be substantially equal to the angle $\alpha$ by which the cylinder block 3 inclines toward the right-hand side shaft-bearing wall 2a, of higher rigidity, of the crankcase 2 under the explosion load.

With this design, it will be noted that, in either of the embodiments illustrated, when the cylinder block 3 is tilted to the right, i.e. toward the right-hand side shaft-bearing wall 2a of crankcase 2, the axes P and C of piston 5 and cylinder bore 6 are brought into coincidence with each other and the mating surfaces of the piston 5 and cylinder bore 6 and those of the crankpin 1a and associated bore 8a in the large end of connecting rod 8 are both placed in parallel with each other, resulting in a substantial increase in the area of contact therebetween. Owing to this, there is no occurrence of any excessive rise of the contact pressure even under the explosion load and wear of the mating surfaces is effectively prevented or reduced to a remarkable extent.

Incidentally, in the other engine strokes, in which the engine parts such as piston 5 and cylinder block 3 are subjected to a load much smaller than that to which they are subjected in the explosion stroke, the piston 5 is slidably driven with its axis P more or less inclined to the axis C of the cylinder bore 6 but, because of the relatively limited magnitude of the load exerted, uneven wear, if any, of the outer peripheral surface of piston 5 and other bearing surfaces is extremely limited despite of the piston inclination.

To summarize, according to the present invention, the axes of the piston and associated cylinder bore substantially coincide with each other when the cylinder block is tilted or inclined in a definite direction under the tensile load acting with explosion in the associated combustion chamber. This enables the sliding parts of the engine to work in a properly aligned state particularly at the peak of load and any uneven wearing of such parts due to load concentration is effectively prevented. Additional advantages of the present invention include material reduction in frictional resistance of the sliding parts and substantial improvements in durability and power output of the engine.

What is claimed is:

1. An internal-combustion engine comprising a cylinder block having at least one cylinder bore formed therein, a piston slidably fitted in said cylinder bore to define a combustion chamber therein, a crank-shaft connected to said piston, a crankcase having a pair of divided bearing walls rotatably supporting said crankshaft, said bearing walls being different in rigidity from each other, and means mounting said piston for sliding movement along an axis which is normally inclined at a definite angle relative to the axis of said cylinder bore toward the side of that one of said bearing walls which is more rigid than the other such that during the power stroke, the cylinder block is tilted through said definite angle due to the differential rigidity of the bearing walls and the axes of the cylinder block and the piston substantially coincide with one another.

2. An internal-combustion engine as claimed in claim 1, further comprising a timing gear mounted on said crankshaft for operating intake and exhaust valves in phase with rotation of said crankshaft, said timing gear being disposed in said crankcase adjacent the less rigid one of said bearing walls.

3. An internal-combustion engine as claimed in claim 1, in which the axis of said cylinder bore is arranged at right angles to the axis of said crankshaft.

4. An internal-combustion engine as claimed in claim 1, in which the axis of said cylinder bore is normally inclined at said definite angle relative to the axis of said piston, the latter axis being arranged at right angles to the axis of said crankshaft.

* * * * *